(12) United States Patent  
Cai et al.

(10) Patent No.: US 8,483,135 B2  
(45) Date of Patent: Jul. 9, 2013

(54) ONLINE CHARGING FOR SESSIONS THAT ARE TRANSFERRED BETWEEN NETWORK DOMAINS

(75) Inventors: Yigang Cai, Naperville, IL (US); Xiangyang Li, Beijing (CN)

(73) Assignee: Alcatel Lucent, Paris (FR)

( * ) Notice: Subject to any disclaimer, the term of this patent is extended or adjusted under 35 U.S.C. 154(b) by 222 days.

(21) Appl. No.: 12/999,575

(22) PCT Filed: Jul. 30, 2008

(86) PCT No.: PCT/US2008/071637  
§ 371 (c)(1), (2), (4) Date: Dec. 16, 2010

(87) PCT Pub. No.: WO2010/014088  
PCT Pub. Date: Feb. 4, 2010

(65) Prior Publication Data  
US 2011/0170455 A1    Jul. 14, 2011

(51) Int. Cl.  
*H04Q 7/00* (2006.01)  
*H04L 12/66* (2006.01)

(52) U.S. Cl.  
USPC ............................................ 370/328; 370/352

(58) Field of Classification Search  
USPC ........................ 370/328, 331, 338, 351–356  
See application file for complete search history.

(56) References Cited

U.S. PATENT DOCUMENTS

| 2004/0132427 | A1  |  7/2004 | Lee et al. | |
|---|---|---|---|---|
| 2007/0036312 | A1* | 2/2007 | Cai et al. | 379/126 |
| 2007/0103117 | A1* | 5/2007 | Burghardt | 320/119 |
| 2007/0213031 | A1* | 9/2007 | Ejzak et al. | 455/406 |
| 2008/0101570 | A1* | 5/2008 | Cai | 379/115.01 |
| 2008/0205381 | A1* | 8/2008 | Zhu et al. | 370/352 |
| 2008/0261559 | A1* | 10/2008 | Cai et al. | 455/406 |
| 2009/0088129 | A1* | 4/2009 | Cai et al. | 455/406 |

FOREIGN PATENT DOCUMENTS

| EP | 1853001 A | 11/2007 |
|---|---|---|
| EP | 1924024 A | 5/2008 |

* cited by examiner

*Primary Examiner* — Hong Cho  
(74) *Attorney, Agent, or Firm* — Duft Bornsen & Fettig LLP

(57) ABSTRACT

Communication networks and methods are disclosed for providing online charging for a session of a dual mode device that is transferred (seamless handover) from a first network domain to a second network domain. For the session involving the dual mode device, a handover application server or another network element generates a handover charging identifier that may be used in the first network domain and the second network domain. The handover application server then distributes the handover charging identifier to network elements in the second network domain and the first network domain. The network elements in the first network domain and the second network domain insert the handover charging identifier and other context information in online charging requests that are transmitted to an online charging system. The online charging system is then able to correlate online charging requests from both the first network domain and the second network domain.

20 Claims, 10 Drawing Sheets

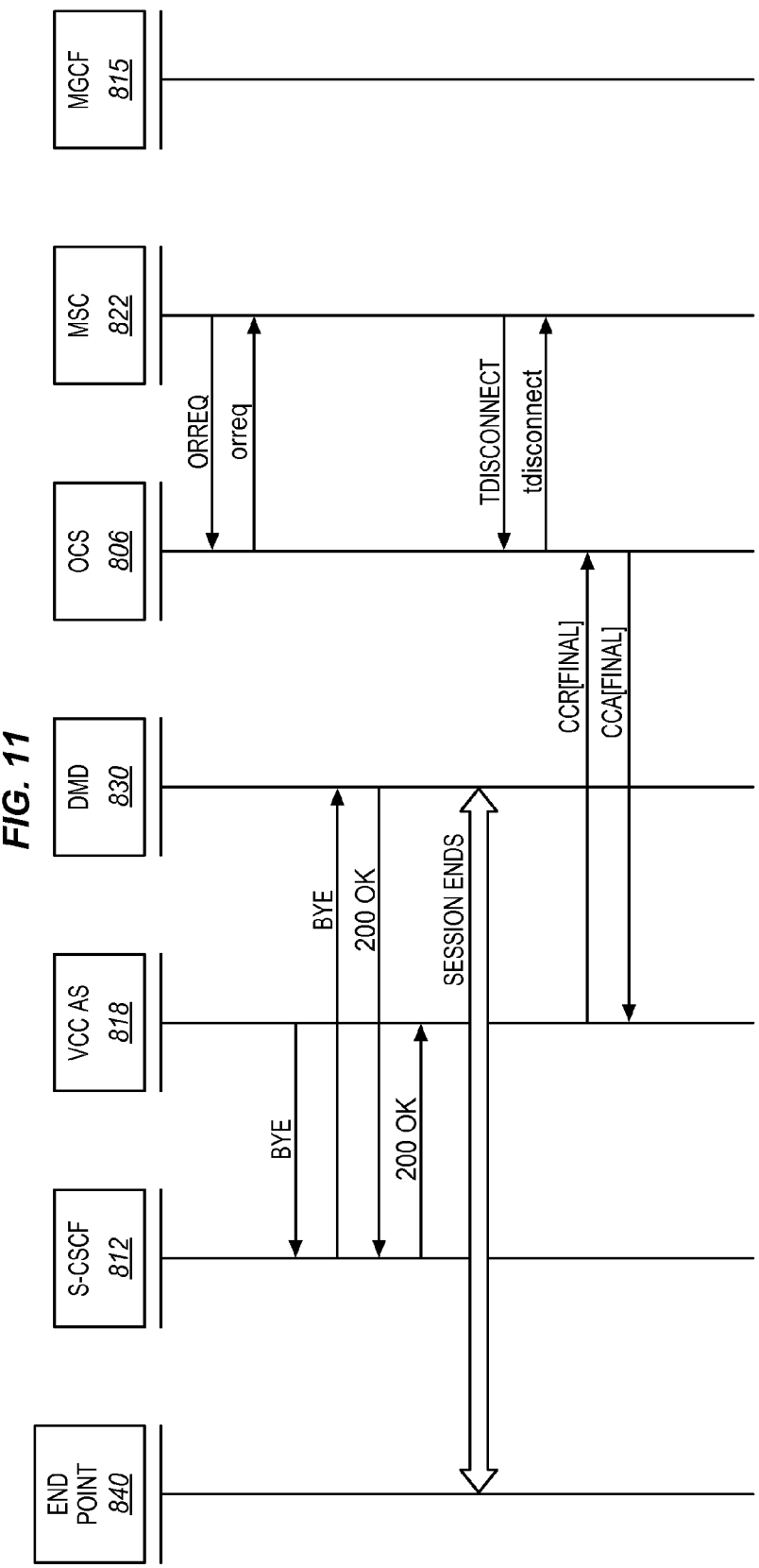

ONLINE CHARGING FOR SESSIONS THAT ARE TRANSFERRED BETWEEN NETWORK DOMAINS

RELATED APPLICATIONS

This application is the National Stage under 35 U.S.C. 371 of International Application No. PCT/US08/71637, filed Jul. 30, 2008, which is incorporated by reference herein.

BACKGROUND OF THE INVENTION

1. Field of the Invention

The invention is related to the field of communication networks and, in particular, to providing for online charging for sessions of dual mode devices that are transferred between network domains (e.g., a session transferred (seamlessly handed over) from an IMS network to a circuit-switched network).

2. Statement of the Problem

One type of communication network gaining popularity is an IP Multimedia Subsystem (IMS) network. As set forth in the $3^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

For a typical session (or call) within an IMS network, user equipment of an IMS subscriber initiates the session through an access network, such as a CDMA network, a GSM network, an IP network, a WiFi network, a WiMAX network, etc, by transmitting the appropriate signaling messages (i.e., SIP messages). The access network then routes the signaling messages to the IMS network. If the access network does not use the same signaling protocols as the IMS network (e.g., SIP), then the access network may route the signaling messages to the IMS network through an appropriate gateway. A serving-call session control function (S-CSCF) in the IMS network receives the signaling messages and attempts to establish the session in the appropriate manner. When the session is established, the S-CSCF may also contact one or more application servers (AS) in the IMS network to provide services for the session, such as voicemail, call forwarding, etc.

To provide online charging (prepaid charging) for the session, each of the IMS network elements (e.g., S-CSCF and AS) handling the session may generate charging messages typically in Diameter Ro protocol. For instance, a network element transmits a Diameter Credit Control Request (CCR [Initial]) message to an Online Charging System (OCS) in the IMS network at an initial triggering event to request a credit quota for the session. Periodically during the session, the network element transmits Diameter CCR[Update] messages to the OCS to request additional credit quotas if needed. At an ending triggering event, the network element transmits a Diameter CCR[Final] message to the OCS to return any unused credits. Each of the charging messages includes an IMS Charging Identifier (ICID) that is assigned to the session so that the charging messages may be correlated in the OCS.

Some service providers allow for dual mode service. Dual mode service allows a communication device to communicate with different types of network domains that utilize different protocols. Typical network domains include a circuit-switched domain, a packet-switched domain, a WLAN domain, and an IMS domain. As an example, dual mode service may allow a communication device to communicate with a circuit-switched network, such as a CDMA network or a GSM network, and also communicate with an IMS network through the appropriate access network. Communication devices that are able to receive a dual mode service are referred to as dual mode devices or dual mode handsets.

When a dual mode device initiates or accepts a session over a first network domain, such as an IMS network, the serving network element in the first network domain determines that the dual mode device has dual mode capabilities and contacts a handover application server (also referred to as a Voice Call Continuity (VCC) application server) presumably in the IMS network. For example, in an IMS network, an S-CSCF contacts the handover application server through SIP or another protocol to indicate the dual mode capabilities of the device. The network element in the first network domain then establishes the session with a destination and a first sub-session is established between the dual mode device and the destination. In response to the first sub-session being established, a first charging identifier is assigned to the session in the first network domain. The first charging identifier is assigned by one of the network elements in the first network domain. The network elements that serve the session generate online charging requests that include the first charging identifier, and transmit the online charging requests to the OCS. The OCS then determines a charging rate for the first sub-session, and generates credit quotas for the network elements serving the first sub-session as is known for online charging.

If the dual mode device moves from the first network domain to a second network domain, such as a circuit-switched network, then the dual mode device transmits another session initiation request to the circuit-switched network. When a dual mode device transfers from one network domain to another network domain, this is often referred to as a "handover". An MSC in the circuit-switched network receives the new session initiation request, and forwards the message to the handover application server. The handover application server operates to establish a second sub-session between the dual mode device and the destination through the second network domain. The handover application server establishes the second session leg so that the session is not interrupted in the handover to the second network domain. The end user keeps the session when actually the session is seamlessly handed over from the first network domain to the second network domain. The end user may not notice the handover during the session. The first sub-session is also torn down.

In response to the second sub-session being established, a second charging identifier is assigned to the session in the second network domain. The network elements in the second network domain that serve the session generate online charging requests that include the second charging identifier, and transmit the online charging requests to the OCS. The OCS then determines a charging rate for the second sub-session, and generates credit quotas for the network elements serving the second sub-session as is known for online charging.

One problem with dual mode services is that there is no effective way to perform online charging for a session when there was a handover from one network domain to another network domain. When there are multiple handovers during one session, a different charging identifier is generated in each network domain. Thus, the OCS is not able to correlate the online charging requests for the same session that was transferred from one network domain to another, and thus cannot correctly determine a charging rate for the session. For example, when a user initiates a session over an IMS network using a dual mode device, the S-CSCF in the IMS network and handover application server trigger online charging requests to the OCS. The OCS grants credit quotas for the first sub-session using the charging rate defined for the IMS network. After 30 minutes, assume that the user walks out of his/her home with the dual mode device and the session continues over a circuit-switched network (e.g., a CDMA network). The MSC in the circuit-switched network triggers an ANSI ORREQ or ANLYZD operation to the OCS. The OCS considers this as a new session, and grants a new credit quota to the MSC with rate calculated from time=0. This calculation is incorrect when the user has a service plan with a stepped tariff, as the OCS should start the rate calculation from time=30 minutes. Unfortunately, without context information for the session, the OCS cannot correlate the ANSI ORREQ or ANLYZD request with the correct starting time and determine an accurate charging rate for the sub-session over the circuit-switched network.

SUMMARY OF THE SOLUTION

Embodiments of the invention introduce a solution for online charging for handover sessions so that independent online charging requests from different network domains can be correlated and the appropriate charging rates may be determined for the sub-sessions in each network domain. To correlate the online charging requests in the OCS, a handover charging identifier is assigned for the session, and is distributed to the network elements that are serving the session in each network domain. When charging is triggered in a network element, the network element inserts the handover charging identifier and possibly other context information in an online charging request, and transmits the online charging request to the OCS. The OCS correlates the received online charging request with other online charging requests (if any) to determine a charging rate for the session. Because the OCS is able to correlate all of the online charging requests for the session based on the handover charging identifier, the OCS is able to accurately determine a charging rate for the session.

As an example, assume that a dual mode device initiates or is invited into a session over a first network domain, such as an IMS network, and that the session is subsequently transferred (seamless handover) to a second network domain, such as a circuit-switched network. A network element in the second network domain receives a session initiation request from the dual mode device, and transmits a corresponding session initiation request to a handover application server. Responsive to receiving the session initiation request, the handover application server identifies a handover charging identifier for the session, and distributes the handover charging identifier to one or more network elements in the second network domain. The network elements in the second network domain that receive the handover charging identifier store the handover charging identifier. At some point during setup of the session or during the session in the second network domain, one or more network elements identify a triggering event for charging. The network elements then identify the stored handover charging identifier assigned to the session, and generate an online charging request for the session. The network elements insert the handover charging identifier in the online charging request, and transmit the online charging request to the OCS.

In a similar manner, the handover application server may also identify a triggering event for charging. Responsive to identifying the triggering event, the handover application server identifies the handover charging identifier assigned to the session, and generates an online charging request for the session. The handover application server then inserts the handover charging identifier in the online charging request, and transmits the online charging request to the OCS.

In another embodiment, the OCS receives the online charging requests from the network elements in the second network domain and/or the handover application server. The OCS may also receive online charging requests from network elements in the first network domain that were serving the session while the session was over the first network domain. The OCS processes the online charging requests to identify the handover charging identifier included in the online charging requests, and any other context information provided in the online charging request. The OCS then correlates the online charging requests for the session to determine a charging rate for the session in the second network domain. Because the online charging requests indicate that the session was transferred from the first network domain, the OCS is able to accurately determine the total duration for the session, and determine the correct charging rate for the session even though the session has been transferred. The OCS then grants credit quotas for the network elements in the second network domain and/or the handover application server that initiated the online charging requests, and generates online charging responses that include the credit quotas. The OCS then transmits the online charging responses to the network elements and/or the handover application server.

Because the network elements in the first network domain, the network elements in the second network domain, and the handover application server each insert the handover charging identifier and other context information in online charging requests to the OCS, the OCS is able to correlate the online charging requests for the session. The OCS is thus able to accurately determine the correct charging rate for a transferred session, even when a stepped tariff is applied to the session. Advantageously, network operators are able to effectively implement online charging for dual mode service.

The invention may include other exemplary embodiments described below.

DESCRIPTION OF THE DRAWINGS

The same reference number represents the same element or same type of element on all drawings.

FIGS. 9-11 are message diagrams illustrating online charging for a transferred session in an exemplary embodiment of the invention.

DETAILED DESCRIPTION OF THE INVENTION

FIGS. 1-11 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
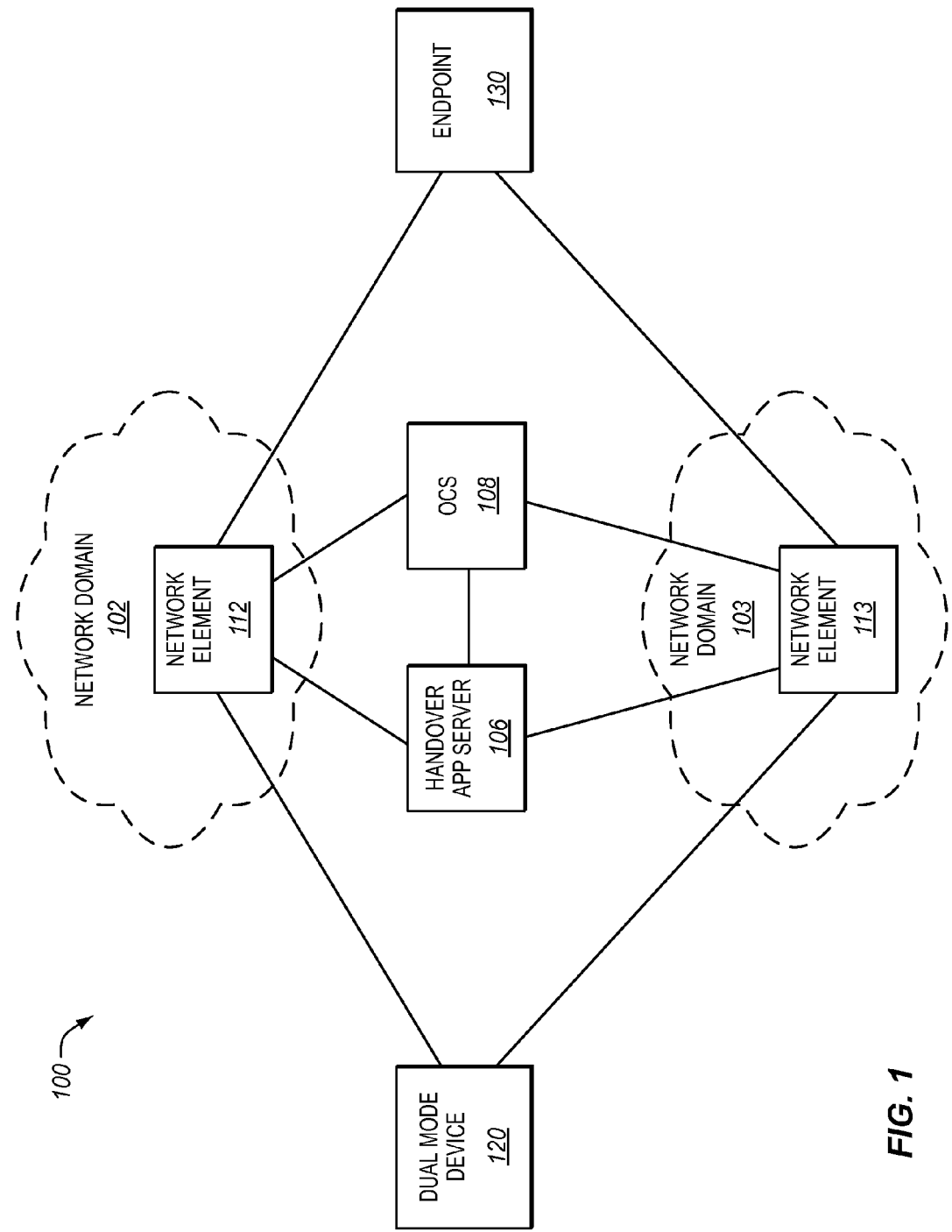
FIG. 1 illustrates a communication network in an exemplary embodiment of the invention.

FIG. 1 illustrates a communication network 100 in an exemplary embodiment of the invention. Communication network 100 includes a first network domain 102 and a second network domain 103. Network domains 102-103 are each collections of network elements organized and configured to provide communication services. Examples of network domains include circuit-switched domains, packet-switched domains, IMS domains, WLAN domains, etc. Network domains 102-103 are different domains that are each operable to provide communication service to a dual mode device 120. For example, network domain 102 may comprise an IMS domain while network domain 103 may comprise a circuit-switched domain. A dual mode device comprises any wireless and/or wireline device operable to communicate with different types of network domains that utilize different protocols. Dual mode device 120 has the capability of communicating with either or both of network domains 102-103 to receive communication service. Dual mode device 120 also has the capability of switching between network domains 102-103 during an established session, which is referred to as a transfer or a handover.

Communication network 100 also includes a handover application server 106 and an Online Charging System (OCS) 108. Handover application server (AS) 106 comprises any system, server, or function operable to provide a handover service for a session of dual mode device 120. Typically, the handover application server 106 may comprise a Voice Call Continuity (VCC) application server operable to provide voice call continuity when the user is moving between network domains. The handover application server or VCC application server may include a mobile management AS function (not shown) and a network domain selection function (not shown) to perform handover between different network domains. The mobile management AS is where the IMS core network emulates an MSC to a circuit-switched network or another type of network element for a different network domain for subscriber access on an IMS network. The network domain selection function determines session delivery routing. The service logic of the network domain selection function routes the session to the appropriate domain (e.g., IMS or circuit-switched) based on the present state of registration within the domains, and operator preferences, and subscriber preferences. Handover application server 106 processes signaling messages for the session to provide a handover from network domain 102 to network domain 103 (or vice-versa) without interruption of the session. Although handover application server 106 is illustrated outside of network domains 102-103, handover application server 106 may be implemented within one of the network domains, such as in the IMS domain.

OCS 108 comprises any system, server, or function operable to perform online charging, such as by receiving online charging requests from network elements that are serving a session, such as handover application server 106, determining a charging rate for the session, and granting credit quotas to the network elements for the session.

Network domain 102 and network domain 103 include network element 112 and network element 113, respectively. Network elements 112-113 comprise any servers, systems, or functions operable to provide communication services and to report charging events to OCS 108. For example, a network element in an IMS domain may comprise a P-CSCF, an S-CSCF, an application server, a media gateway, etc. A network element in a circuit-switched domain may comprise an MSC. Those skilled in the art will appreciate that network domains 102-103 may include many more network elements than are illustrated in FIG. 1. Also, if handover application server 106 is located in a particular network domain, then it may also be referred to as a network element.

According to the embodiments described herein, the network elements are enhanced to include service logic and protocols to provide online charging context information to OCS 108 so that OCS 108 can correlate online charging information for the session, as described below. Online charging context information comprises any data, such as charging identifiers, that is used to correlate charging information for sub-sessions that are over different network domains. For example, in the embodiment described below, a handover charging identifier is assigned to the session, and distributed to the network elements 112-113 in both network domains 102-103. The network elements 112-113 can then use the handover charging identifier in online charging requests to OCS 108 so that OCS 108 can correlate each of the online charging requests for the session, even if the session is transferred to a different network domain. Therefore, OCS 108 can effectively determine the correct charging rate for the session even when the session is transferred.

Figure 2:
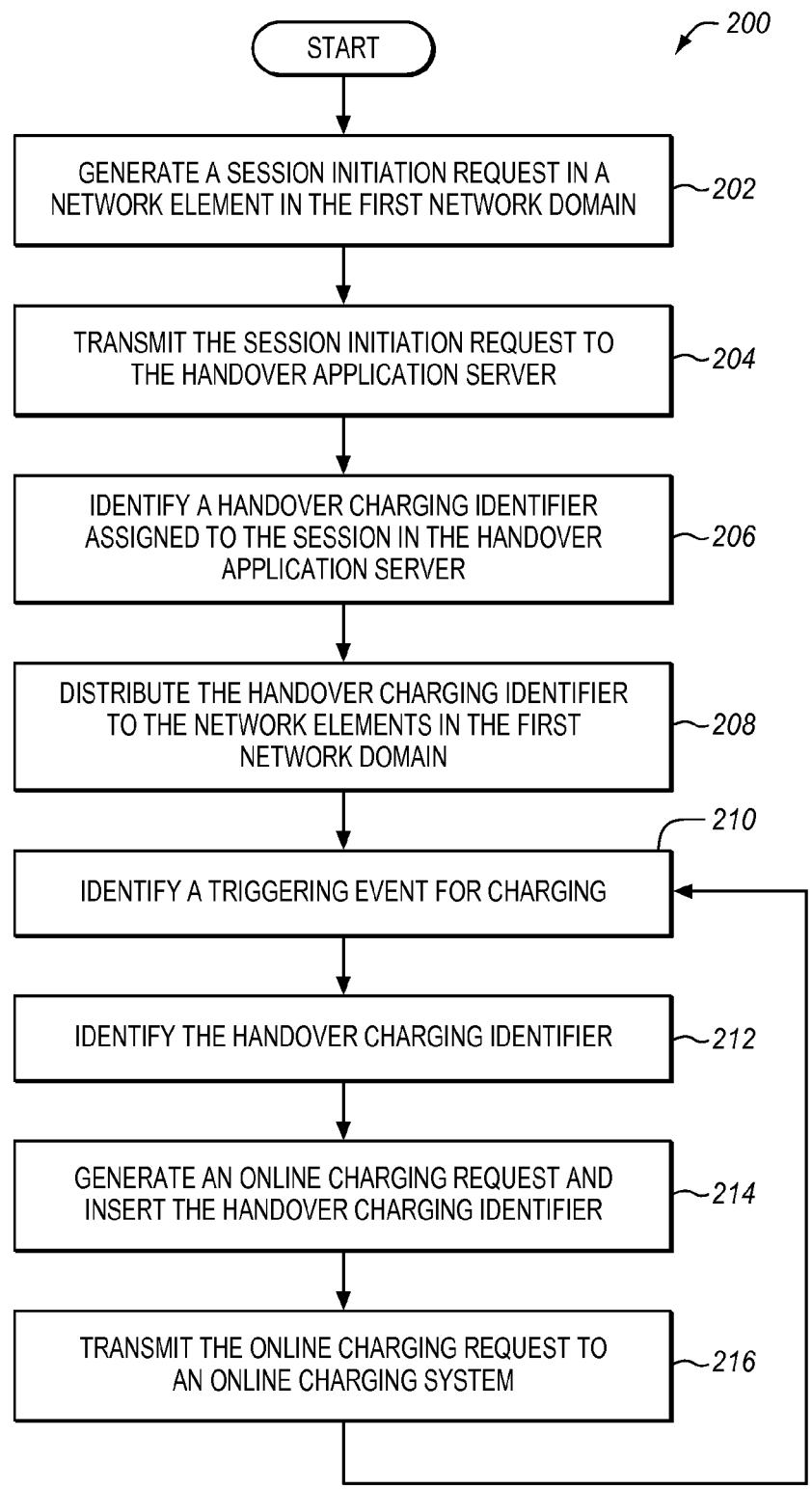
FIG. 2 is a flow chart illustrating a method of distributing online charging context information to network elements in a first network domain and to an OCS in an exemplary embodiment of the invention.

FIG. 2 is a flow chart illustrating a method 200 of distributing online charging context information to network elements in network domain 102 and to OCS 108 in an exemplary embodiment of the invention. The steps of method 200 will be described with reference to communication network 100 in FIG. 1. The steps of the flow chart in FIG. 2 are not all inclusive and may include other steps not shown.

Assume in FIG. 1 that dual mode device 120 registers with network domain 102, and initiates or is invited into a session with an endpoint 130 through a session initiation request. Responsive to receiving the session initiation request from either dual mode device 120 or endpoint 130, network element 112 in network domain 102 assigns a network element (NE) charging identifier to the session. A NE charging identifier comprises any number, code, string, etc, that is assigned to the session. As an example of assigning an NE charging identifier, if network domain 102 comprises an IMS domain, then a P-CSCF (not shown), a media gateway (not shown), or another network element in the IMS network that receives a session initiation request (e.g., SIP INVITE) will assign an IMS Charging Identifier (ICID) that is unique to that session.

Network element 112 also processes filter criteria for dual mode device 120 (or its associated user) upon receiving the session initiation request to determine that dual mode device 120 has dual mode capabilities. Because dual mode device 120 has dual mode capabilities, network element 112 determines that handover application server 106 should be involved in the session to handle any network domain transfers that may occur. Thus, network element 112 generates a session initiation request, such as a SIP INVITE, in step 202 that includes the NE charging identifier assigned by network element 112. Network element 112 then transmits the session initiation request to handover application server 106 to include handover application server 106 in the session in step 204.

Responsive to receiving the session initiation request, handover application server 106 executes service logic to prepare for a transfer of network domains during the session. Also, handover application server 106 identifies a handover charging identifier for the session in step 206. A handover charging identifier comprises any number, code, string, etc, that identifies a session regardless of the network domain(s) over which the session is connected for the purpose of online charging. Thus, the handover charging identifier is not unique and understood only in a single network domain, but is unique and understood across multiple network domains. Handover application server 106 may generate a new and unique handover charging identifier for the session, may re-use the initial NE charging identifier as the handover charging identifier, or may otherwise identify the handover charging identifier. Handover application server 106 then distributes the handover charging identifier to network element 112 and other network elements (not shown) in network domain 102 in step 208. To distribute the handover charging identifier, handover application server 106 generates a session initiation response, such as a SIP 200 OK, that includes the handover charging identifier, and transmits the session initiation response to network element 112. Handover application server 106 may operate in a similar manner responsive to receiving other session initiation requests from other network elements in network domain 102.

Network element 112 receives the session initiation response from handover application server 106, and stores the handover charging identifier. Network element 112 may distribute the handover charging identifier to other network elements (not shown) in network domain 102, if not already done by handover application server 106. Other signaling further occurs to complete the session over network domain 102.

At some point during setup of the session or during the session in network domain 102, network element 112 identifies a triggering event for charging in step 210, such as based on a Charging Trigger Function (CTF) that is defined to provide online charging for the session. In step 212, network element 112 identifies the handover charging identifier assigned to the session. Network element 112 then generates an online charging request for the session, and inserts the handover charging identifier in the online charging request in step 214. The online charging request may be an Initial, an Update, or a Final message. As an example, the online charging request may comprise a Credit Control Request (CCR) [Initial, Update, Final] message as defined in Diameter Ro protocol. Network element 112 may also include the NE charging identifier, and other charging information in the online charging request. For example, network element 112 may also include an NE type, an NE address, a domain type, a domain realm, a user identifier, a destination identifier, service information, service type, request type, a sub-session identifier, a sub-session service start/stop time, a sub-session service elapse time, etc. The handover charging identifier and the additional charging information comprises online charging context information.

When inserting the NE charging identifier in the online charging request along with other charging information, the online charging request may have a parameter already designated for the NE charging identifier and the other charging information. For example, in a Diameter CCR message, there is an attribute value pair (AVP) designated for the NE charging identifier. To insert the handover charging identifier (and possibly other charging information), a new parameter may be designated for the handover charging identifier in the online charging request. For example, a first new AVP in a Diameter CCR message may be designated for the handover charging identifier. A second new AVP in a Diameter CCR message may be designated for a handover indicator indicating the transfer of the session from network domain 102 to network domain 103. A third new AVP in a Diameter CCR message may be designated for a timestamp indicating when the transfer occurs from network domain 102 to network domain 103. Network element 112 then transmits the online charging request to OCS 108 in step 216.

In a similar manner, handover application server 106 also identifies a triggering event for charging, such as based on a CTF, in step 210. In step 212, handover application server 106 identifies the handover charging identifier assigned to the session. Handover application server 106 then generates an online charging request for the session, and inserts the handover charging identifier in the online charging request in step 214. Handover application server 106 may also include one or more NE charging identifiers, and other charging information in the online charging request. For example, handover application server 106 may also include a list of NE charging identifiers, a domain handover indicator, a domain handover charging type, a domain handover timestamp, a list of associated NE sub-session identifiers, etc. The handover charging identifier and the additional charging information comprises online charging context information. If the online charging request does not include the appropriate parameters for this context information, such as for the newly defined handover charging identifier, then a new parameter may be designated for the handover charging identifier or other context information as described above. Handover application server 106 then transmits the online charging request to OCS 108 in step 216.

Handover application server 106 and network element 112 may comprise hardware, software, or firmware that is operable to perform the functions described above. For example, handover application server 106 and network element 112 may each include a signaling system that is operable to receive, process, and transmit signaling messages in the protocol of the appropriate network domain. Handover application server 106 and network element 112 may each include a storage system that is operable to store the handover charging identifier and other context information. Handover application server 106 and network element 112 may each further include a charging system, such as a CTF, that is operable to trigger on charging events, and interface with OCS 108 to provide online charging requests to OCS 108.

Figure 3:
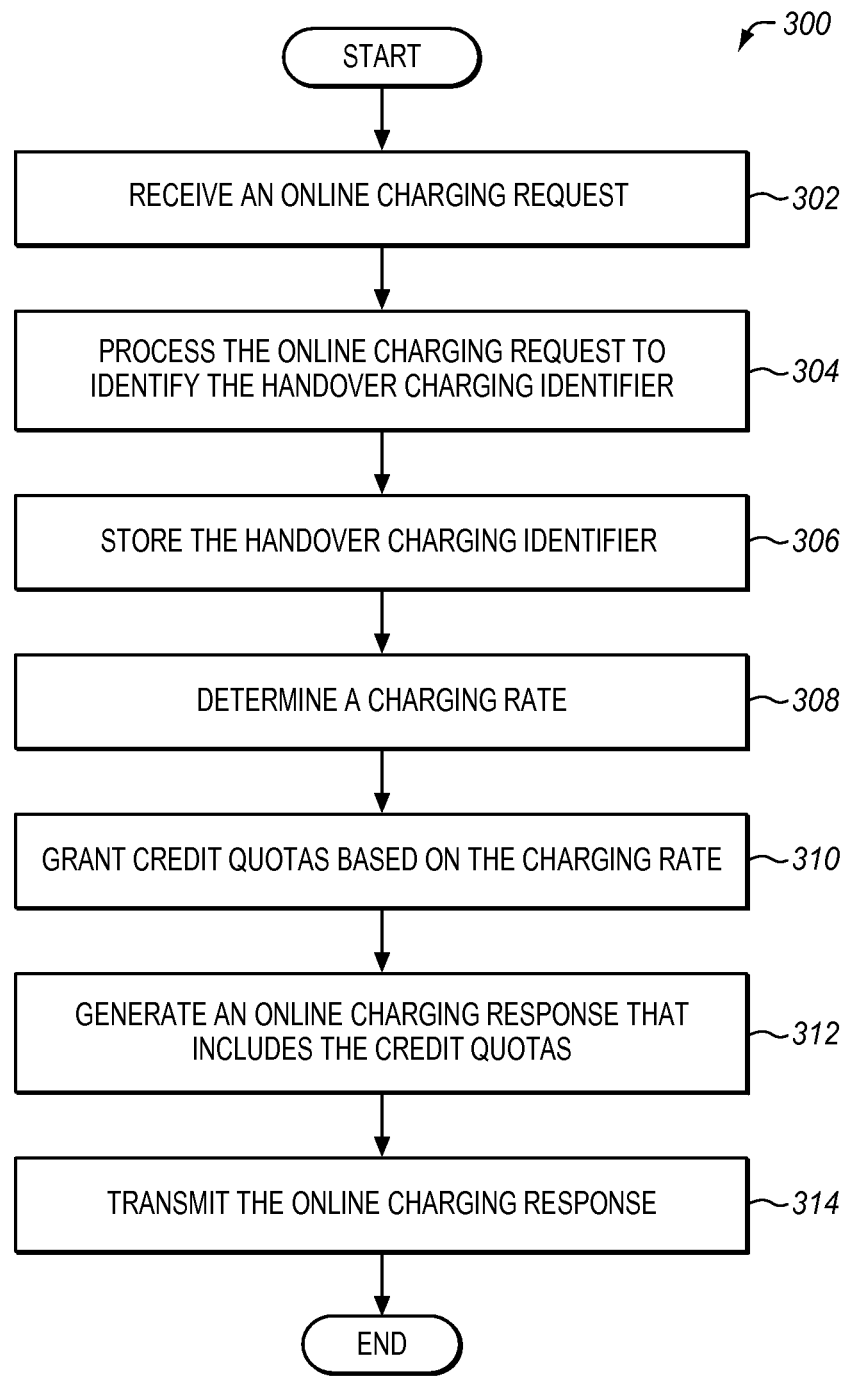
FIG. 3 is a flow chart illustrating a method of processing online charging requests in an OCS in an exemplary embodiment of the invention.

FIG. 3 is a flow chart illustrating a method 300 of processing online charging requests in OCS 108 in an exemplary embodiment of the invention. The steps of method 300 will be described with reference to communication network 100 in FIG. 1. The steps of the flow chart in FIG. 3 are not all inclusive and may include other steps not shown.

In step 302, OCS 108 receives the online charging requests from network element 112 and/or handover application server 106. OCS 108 may additionally receive online charging requests from other network elements in network domain 102. In step 304, OCS 108 processes the online charging requests to identify the handover charging identifier and any NE charging identifiers included in the online charging requests. In step 306, OCS 108 stores the handover charging identifier and any NE charging identifiers for the purpose of correlating the charging requests for the session. OCS 108 then performs online charging operations for the session. For instance, OCS 108 determines a charging rate in step 308. The charging rate is determined based on a tariff in the service plan, and the duration of the session (assuming a stepped tariff). OCS 108 grants credit quotas for the network elements that initiated the online charging requests, such as network element 112 and handover application server 106, based on the charging rate in step 310. One assumption is that the dual mode device 120 has been properly authorized and there is a sufficient balance in the user's account for the session. OCS 108 then generates online charging responses that include the credit quotas in step 312, and transmits the online charging responses to network element 112 and handover application server 106 in step 314. OCS 108 operates in a similar manner responsive to receiving additional online charging requests from network element 112, handover application server 106, and other network elements (not shown) in network domain 102.

As the session progresses in network domain 102, network element 112 and handover application server 106 may transmit additional online charging requests to OCS 108. As more network elements in network domain 102 serve the session, these network elements will contact handover application server 106 as described above, and handover application server 106 will distribute the handover charging identifier to these network elements. Thus, when the network elements in network domain 102 generate online charging requests, the network elements will insert the handover charging identifier in the online charging requests to OCS 108 so that OCS 108 can correlate any online charging requests for the session.

Assume further that at some point the session is transferred from network domain 102 to network domain 103 (see FIG. 1), which is also referred to as a handover. The desire for a handover may be for a variety of reasons. For example, if dual mode device 120 moves to an area served by network domain 103, then dual mode device 120 may register with network domain 103. According to the service logic of dual mode device 120, dual mode device 120 may determine that network domain 103 is the preferred mode of communication due to costs, available services, service areas, etc. Thus, dual mode device 120 generates another session initiation request in the protocol used by network domain 103, and transmits the session initiation request to network element 113 in network domain 103.

Responsive to receiving the session initiation request, network element 113 in network domain 103 assigns another network element (NE) charging identifier to the session. As an example of assigning an NE charging identifier, if network domain 103 comprises a circuit-switched domain (e.g., a CDMA network), then an MSC (not shown) or another network element in the circuit-switched network that receives a session initiation request (e.g., ISUP IAM) will assign a charging identifier that is unique to that session.

Figure 4:
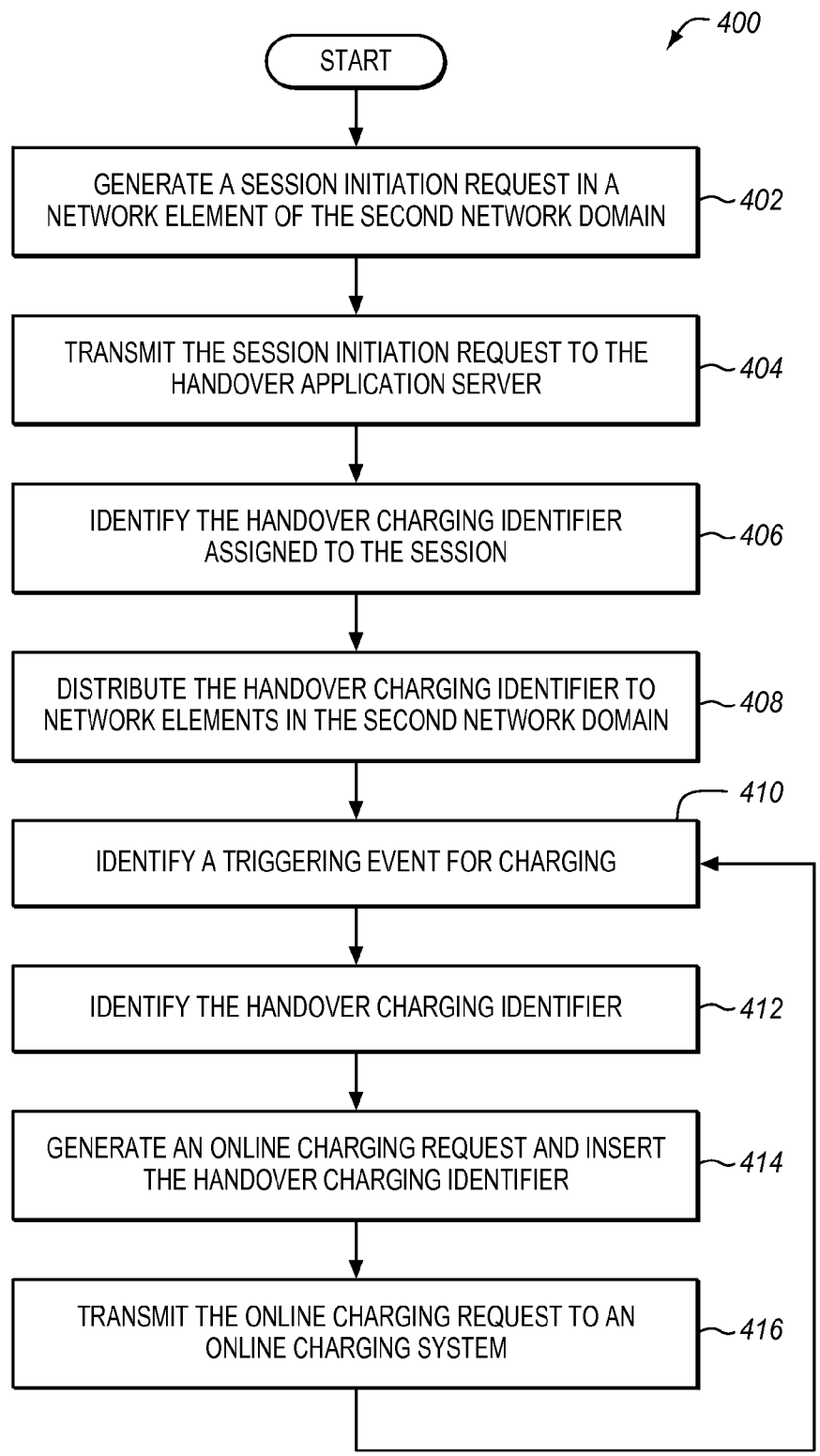
FIG. 4 is a flow chart illustrating a further method of distributing online charging context information to network elements in a second network domain and to the OCS in an exemplary embodiment of the invention.

FIG. 4 is a flow chart illustrating a further method 400 of distributing context information for online charging to network elements in network domain 103 and to OCS 108 in an exemplary embodiment of the invention. The steps of method 400 will be described with reference to communication network 100 in FIG. 1. The steps of the flow chart in FIG. 4 are not all inclusive and may include other steps not shown.

Responsive to receiving the session initiation request, network element 113 processes filter criteria for dual mode device 120 (or its associated user) to determine that dual mode device 120 has dual mode capabilities and that the session is being transferred from another network domain 102. Thus, network element 113 generates a session initiation request, such as an ANSI ORREQ, that includes the NE charging identifier assigned by network element 113 in step 402. Network element 113 then transmits the session initiation request to handover application server 106 to include handover application server 106 in the session in step 404.

Responsive to receiving the session initiation request, handover application server 106 executes service logic to prepare for a transfer of network domains during the session. Also, handover application server 106 identifies the handover charging identifier assigned to the session in step 406. Handover application server 106 then distributes the handover charging identifier to network element 113 and other network elements (not shown) in network domain 103 in step 408. To distribute the handover charging identifier, handover application server 106 generates a session initiation response, such as an ANSI orreq, that includes the handover charging identifier, and transmits the session initiation response to network element 113. Handover application server 106 may operate in a similar manner responsive to receiving other session initiation requests from other network elements (not shown) in network domain 103.

Network element 113 receives the session initiation response from handover application server 106, and stores the handover charging identifier. Network element 113 may distribute the handover charging identifier to other network elements (not shown) in network domain 103, if not already done by handover application server 106. Other signaling further occurs to complete the session over network domain 103.

At some point during the session, network element 113 identifies a triggering event for charging, such as based on a CTF, in step 410. In step 412, network element 113 identifies the handover charging identifier assigned to the session. Network element 113 then generates an online charging request for the session, and inserts the handover charging identifier in the online charging request in step 414. Network element 113 may also include the NE charging identifier, and other charging information in the online charging request. For example, network element 113 may insert a handover indicator in the online charging request indicating the transfer of the session from network domain 102 to network domain 103. Network element 113 may also identify a timestamp for the transfer of the session, and insert the timestamp in the online charging request. If the online charging request does not include the appropriate parameters for this context information, such as for the newly defined handover charging identifier, then a new parameter may be designated for the handover charging identifier or other context information as described above. Network element 113 then transmits the online charging request to OCS 108 in step 416.

As was described above, handover application server 106 also identifies one or more triggering events for charging during the session over network domain 103. Handover application server 106 thus identifies the handover charging identifier assigned to the session (see step 212 in FIG. 2). Handover application server 106 generates an online charging request for the session, and inserts the handover charging identifier in the online charging request (see step 214 in FIG. 2). Handover application server 106 may also include one or more NE charging identifiers, and other context and/or charging information in the online charging request. Handover application server 106 then transmits the online charging request to OCS 108 (see step 216 in FIG. 2).

Network element 113 may also comprise hardware, software, or firmware that is operable to perform the functions described above. For example, network element 113 may each include a signaling system that is operable to receive, process, and transmit signaling messages in the protocol of the appropriate network domain. Network element 113 may each include a storage system that is operable to store the handover charging identifier and other context information. Network element 113 may each further include a charging system, such as a CTF, that is operable to trigger on charging events, and interface with OCS 108 to provide online charging requests to OCS 108.

Figure 5:
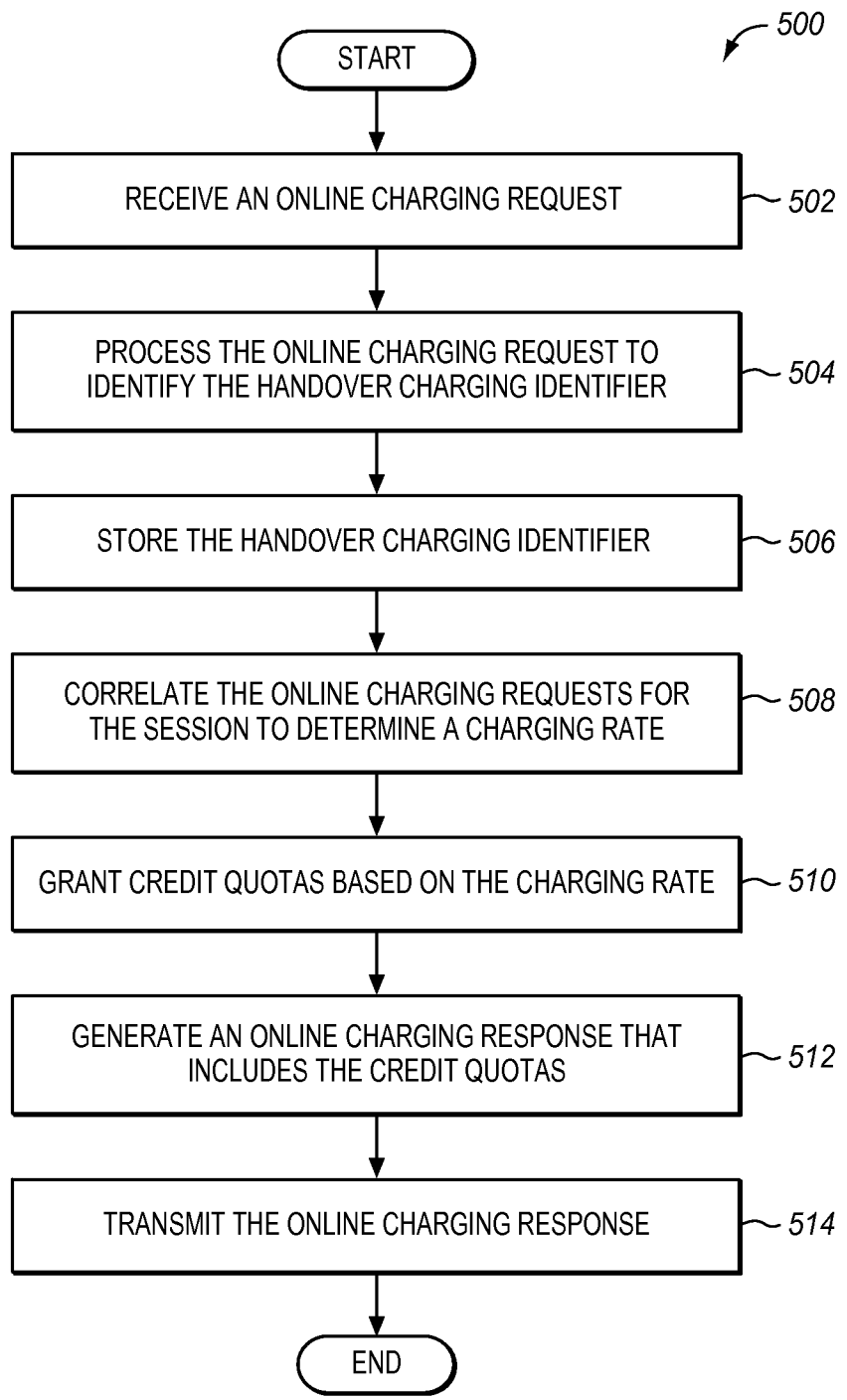
FIG. 5 is a flow chart illustrating a further method of processing online charging requests in the OCS after a domain transfer in an exemplary embodiment of the invention.

FIG. 5 is a flow chart illustrating a further method 500 of processing online charging requests in OCS 108 after a domain transfer in an exemplary embodiment of the invention. The steps of method 500 will be described with reference to communication network 100 in FIG. 1. The steps of the flow chart in FIG. 5 are not all inclusive and may include other steps not shown.

In step 502, OCS 108 receives the online charging requests from network element 113 and/or handover application server 106. OCS 108 may additionally receive online charging requests from other network elements in network domain 103. In step 504, OCS 108 processes the online charging requests to identify the handover charging identifier and any NE charging identifiers included in the online charging requests. In step 506, OCS 108 stores the handover charging identifier and any NE charging identifiers. OCS 108 then performs online charging operations for the session. For instance, correlates the online charging requests for the session to determine a charging rate in step 508. More particularly, OCS 108 processes the online charging context information provided in the online charging requests to determine a charging rate. OCS 108 may correlate the online charging requests responsive to identifying that the session has been transferred from one network domain to another, or may correlate the online charging requests automatically. Because the online charging context information indicates that the session was transferred from another network domain 102, OCS 108 is able to accurately determine the total duration for the session, and determine the correct charging rate for the session. If the user of dual mode device 120 has a service plan with a stepped tariff, then OCS 108 is able to correctly determine the charging rate for the sub-session over network domain 103. For example, assume that the session was transferred from network domain 102 to network domain 103 after 30 minutes. Due to the online charging context information, OCS 108 is able to determine that the charging rate should be determined from time=30 instead of time=0. For a stepped tariff, OCS 108 is able to determine the correct charging rate.

In step 510, OCS 108 grants credit quotas for the network elements that initiated the online charging requests, such as network element 113 and handover application server 106, based on the charging rate. One assumption again is that the dual mode device 120 has been properly authorized and there is a sufficient balance in the user's account for the session. OCS 108 then generates online charging responses that include the credit quotas in step 512, and transmits the online charging responses to network element 113 and handover application server 106 in step 514. OCS 108 operates in a similar manner responsive to receiving additional online charging requests from network element 113, handover application server 106, and other network elements (not shown) in network domain 103.

As the session progresses in network domain 103, network element 113 and handover application server 106 may transmit additional online charging requests to OCS 108. As more network elements in network domain 103 serve the session, these network elements will contact handover application server 106 as described above, and handover application server 106 will distribute the handover charging identifier to these network elements. Thus, when the network elements in network domain 103 generate online charging requests, the network elements will insert the handover charging identifier in the online charging requests to OCS 108 so that OCS 108 can correlate any online charging requests for the session.

Figure 6:
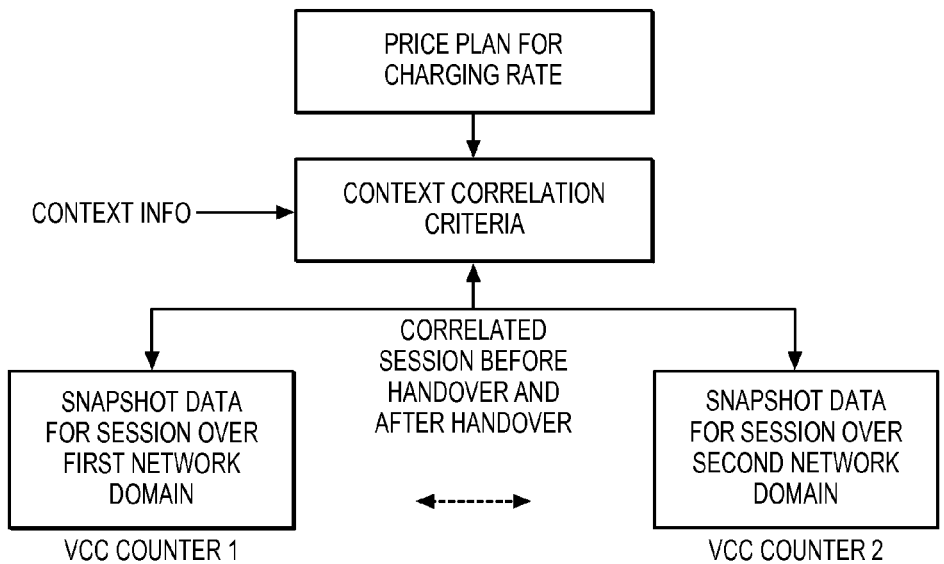
FIG. 6 illustrates a relationship of context information, a handover counter, and price plan in the OCS in an exemplary embodiment of the invention.

To correlate online charging requests, OCS 108 may implement a handover counter that maintains present online charging snapshot data for each network element 112 in network domain 102 before the transfer of the session, and maintains present online charging snapshot data for each network element 113 in network domain 103 after the transfer of the session. FIG. 6 illustrates a relationship of context information, a handover counter, and price plan in OCS 108 in an exemplary embodiment of the invention. Each VCC update is based on context information as the counter update criteria (i.e., when the received charging information from each network element in each network domain matches the VCC counter context information), and the handover counter is updated to store the context information.

OCS 108 uses the context information as rating criteria to determine the charging rate for the session. Thus, when the session in network domain 102 is transferred to network domain 103, the two sub-sessions in each network domain 102-103 are treated as the same continuous session to use the same price plan. Whether the two correlated sub-sessions share the price plan or charge based on each individual price plan, is based on the network operator's configuration.

When OCS 108 determines that the session has transferred from network domain 102 to network domain 103, OCS 108 may terminate online charging to network elements 112 in network domain 102. OCS 108 may request that network elements 112 in network domain 102 either just suspend charging, or stop charging and return any unused credits back to OCS 108.

Figure 7:
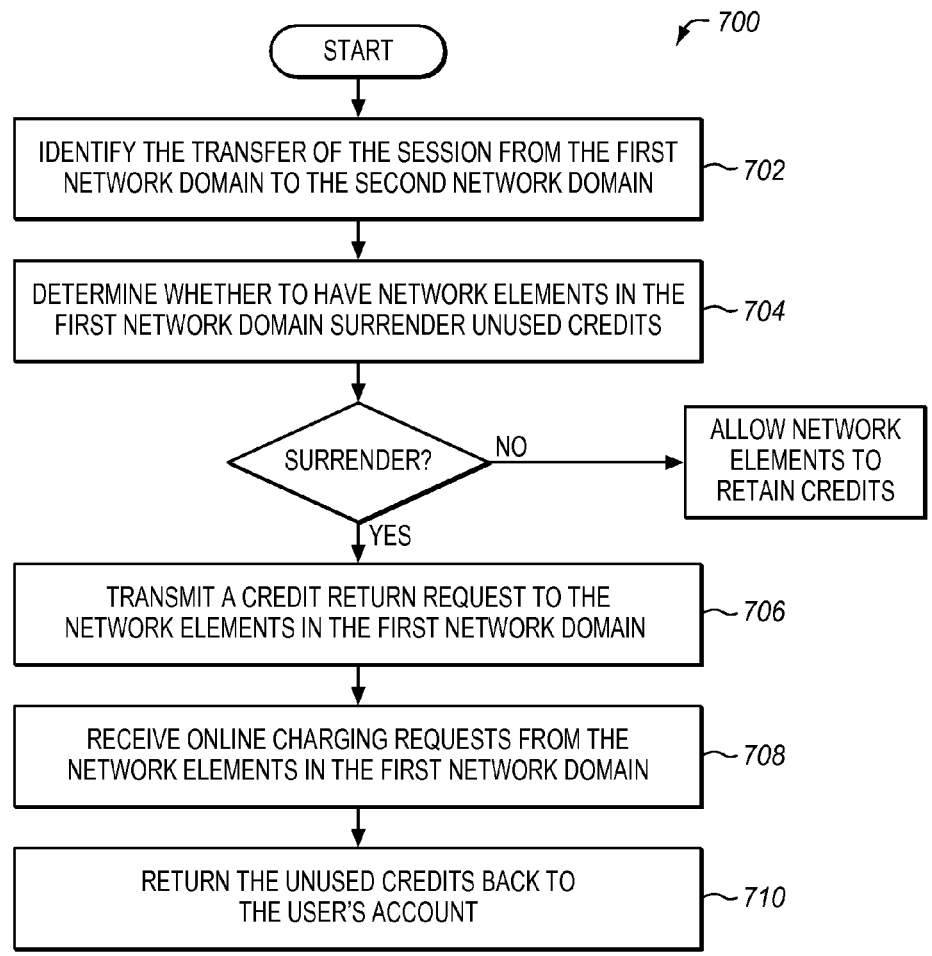
FIG. 7 is a flow chart illustrating a method of surrendering unused credits after a domain transfer in an exemplary embodiment of the invention.

FIG. 7 is a flow chart illustrating a method 700 of surrendering unused credits after a domain transfer in an exemplary embodiment of the invention. The steps of method 700 will be described with reference to communication network 100 in FIG. 1. The steps of the flow chart in FIG. 7 are not all inclusive and may include other steps not shown.

Upon identifying the transfer of the session from network domain 102 to network domain 103 in step 702, OCS 108 determines whether to have network elements 112 in network domain 102 surrender unused credits in step 704. The OCS VCC charging policy management determines whether the network elements 112 should surrender unused credits based on one or more of the following rules or conditions: the tariff towards the network elements in the network domain 102 changes after the transfer, the user's account balance is below a threshold, the user or operator provisioning the credit surrendering after the transfer, the handover types (i.e., from what network domain to what network domain), the prepaid lifecycle, etc. If the determination is to have the network elements 112 surrender the unused credits, then OCS 108 transmits a credit return request to network element 112 and other network elements in network domain 102 in step 706. For example, OCS 108 may transmit a Diameter Re-Authorization-Request (RAR) to network element 112 requesting that network element 112 return any unused credits. Responsive to the credit return request, network element 112 generates an online charging request that includes the remaining credits, such as a Diameter CCR, and transmits the online charging request to OCS 108. A similar process is used to have handover application server 106 return any unused credits.

OCS 108 receives the online charging requests from network element 112, any other network elements in network domain 102, and handover application server 106 in step 708, and returns the unused credits back to the user's account in step 710. OCS 108 also updates the account status and lifecycle.

EXAMPLE

Figure 8:
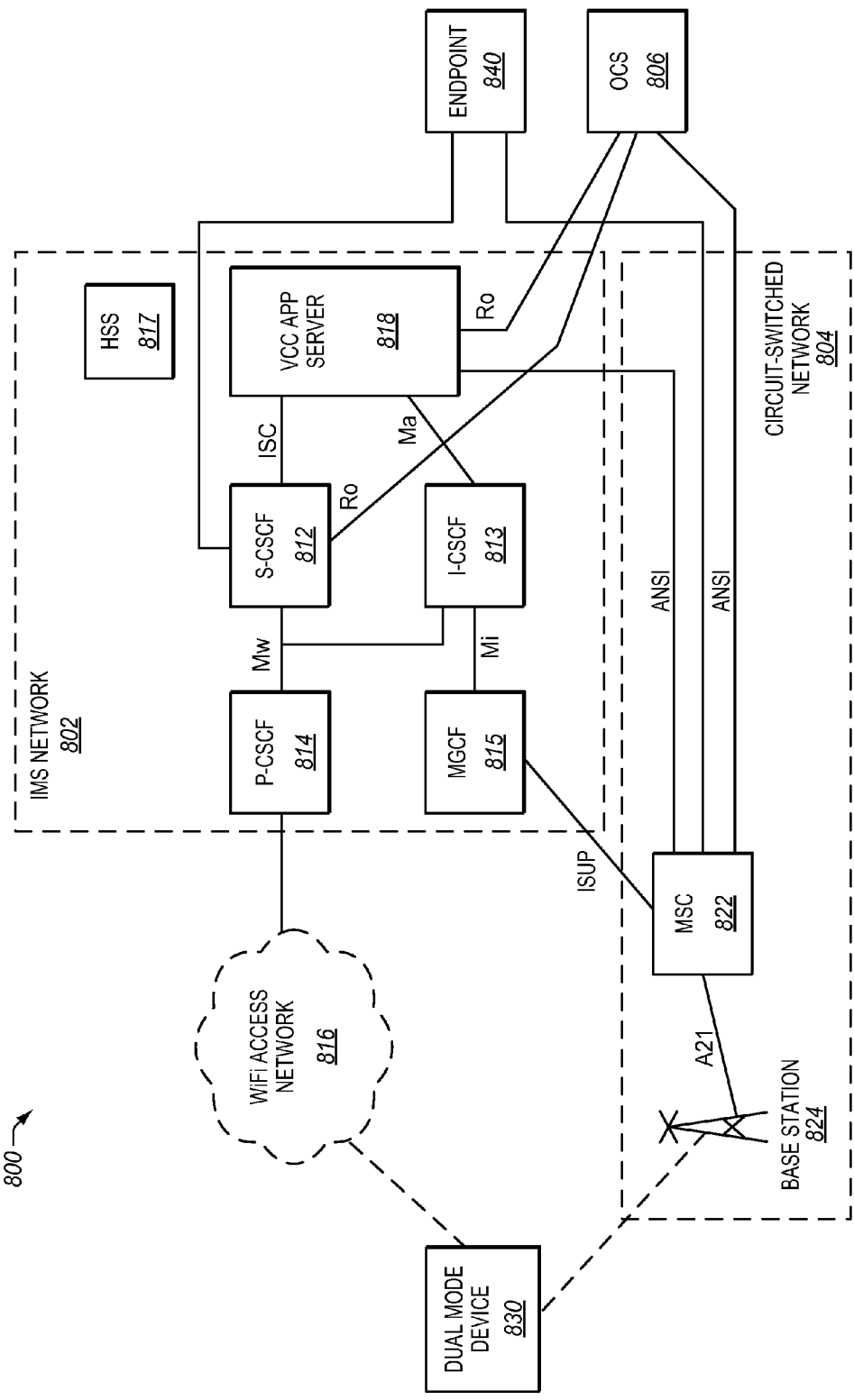
FIG. 8 illustrates another communication network in an exemplary embodiment of the invention.

FIGS. 8-11 illustrate an example of online charging for a session that is seamlessly handed over from one network domain to another network domain. FIG. 8 illustrates a communication network 800 in an exemplary embodiment of the invention. Communication network 800 includes an IMS network 802, a circuit-switched network 804, such as a GSM network or a CDMA network, and an OCS 806. IMS network 802 includes a Serving-CSCF (S-CSCF) 812, an Interrogate-CSCF (I-CSCF) 813, a Proxy-CSCF (P-CSCF) 814, a media gateway control function (MGCF) 815, a WiFi access network 816, a Home Subscriber Server (HSS) 817, and a VCC application server 818. IMS network 802 may include other network elements that are not shown for the sake of brevity. Circuit-switched network 804 includes an MSC 822 and a base station 824. Circuit-switched network 804 may include other network elements that are not shown for the sake of brevity. The example in FIGS. 8-11 illustrates charging for a seamless handover from IMS network 802 to circuit-switched network 804 when a dual mode device 830 is invited to a session by endpoint 840.

Figure 9:
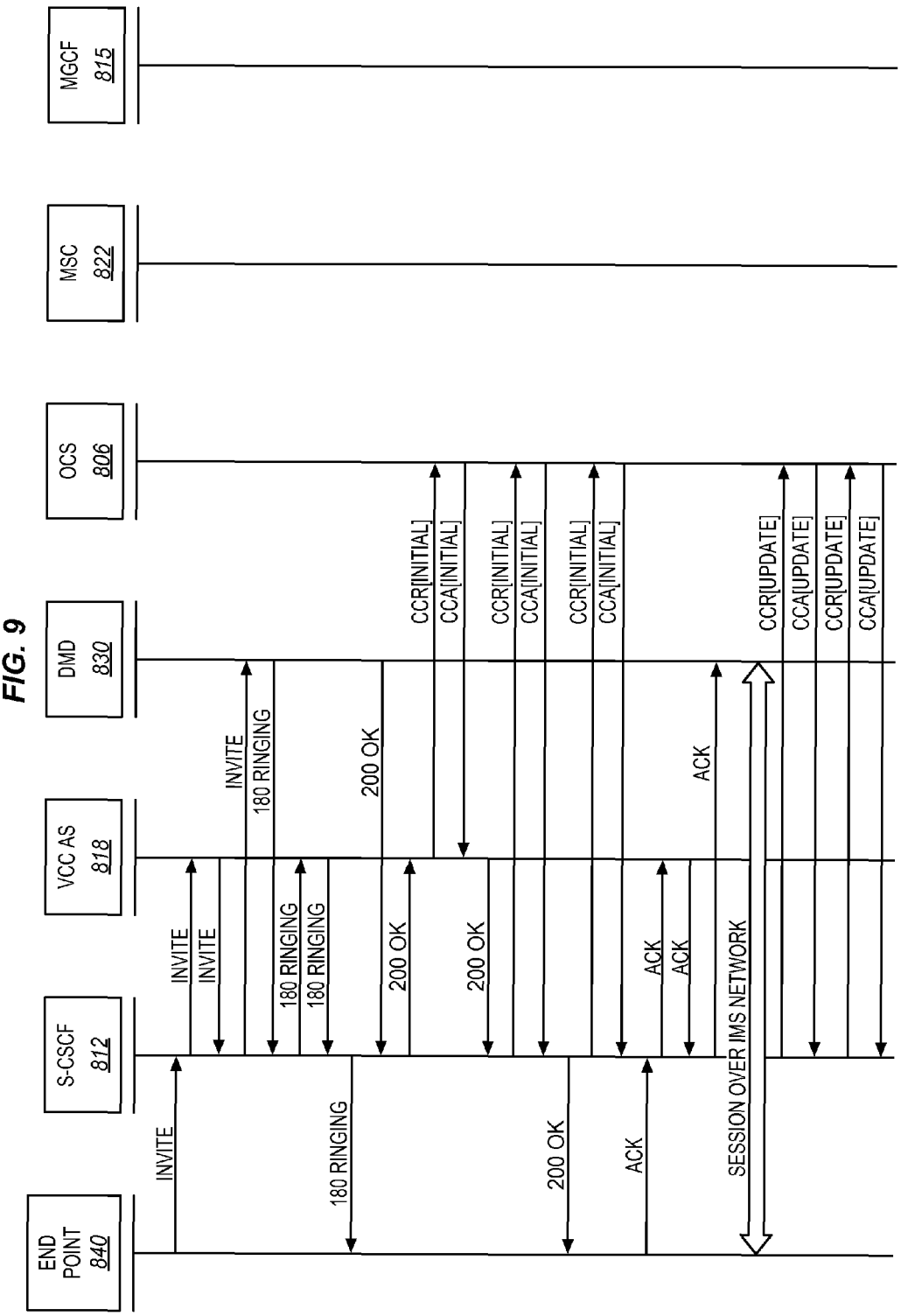
Figure 10:
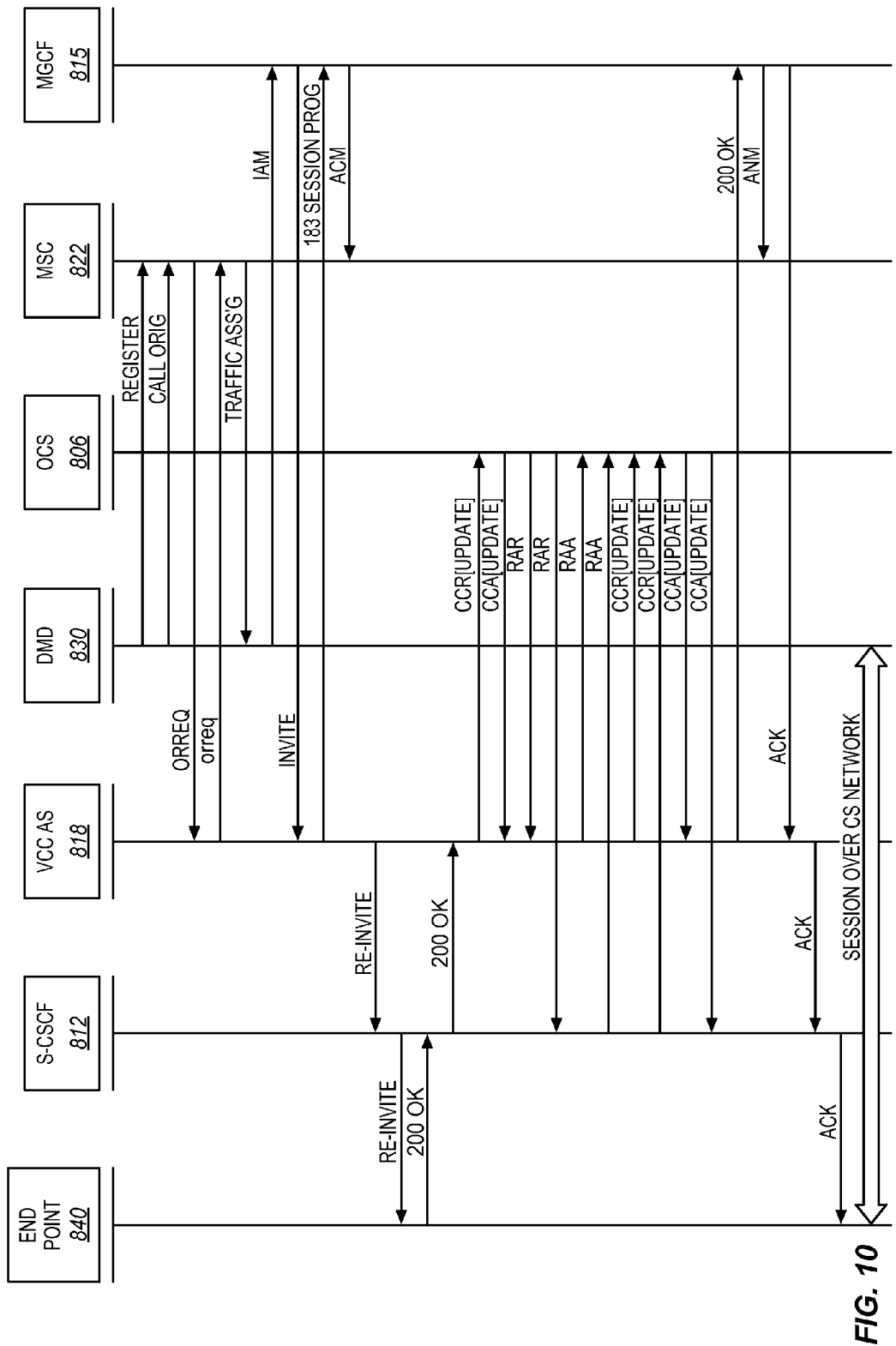

FIGS. 9-11 are message diagrams illustrating online charging for a transferred session in an exemplary embodiment of the invention. Assume that endpoint 840 (see FIG. 8) wants to initiate a session with dual mode device 830. To initiate the session in FIG. 9, endpoint 840 generates a SIP INVITE and transmits the INVITE to S-CSCF 812 in IMS network 802. Responsive to the INVITE inviting dual mode device 830 to a session, S-CSCF 812 processes initial filter criteria (iFC) for dual mode device 830, which indicates that dual mode device 830 has dual mode functionality. Thus, S-CSCF 812 includes VCC application server 818 in the session by transmitting a SIP INVITE to VCC application server 818 to establish SIP dialog 1 between VCC application server 818 and endpoint 840.

VCC application server 818, which acts as a back-to-back user agent (B2BUA), determines that the session needs to be delivered to IMS network 802, and transmits a SIP INVITE to S-CSCF 812 that is serving dual mode device 830. S-CSCF 812 then transmits the INVITE to dual mode device 830 through P-CSCF 814 in order to establish SIP dialog 2 between the VCC application server 818 and dual mode device 830.

Dual mode device 830 returns a SIP 180 Ringing with the SDP of the bearer to S-CSCF 812 (via P-CSCF 814), and S-CSCF 812 transmits the SIP 180 Ringing to VCC application server 818. VCC application server 818 transmits the SIP 180 Ringing to S-CSCF 812, and S-CSCF 812 forwards the SIP 180 Ringing to endpoint 840.

Dual mode device 830 then transmits a SIP 200 OK to S-CSCF 812 (via P-CSCF 814), and S-CSCF 812 transmits the 200 OK to VCC application server 818. Responsive to receiving the 200 OK, VCC application server 818 identifies a charging event. Thus, VCC application server 818 generates a Diameter CCR[Initial], identifies the handover charging identifier assigned to the session, and inserts the handover charging identifier in the Diameter CCR[Initial]. VCC application server 818 may also include one or more NE charging identifiers, and other charging information in the CCR[Initial]. For example, VCC application server 818 may also include a list of NE charging identifiers, a domain handover indicator, a domain handover charging type, a domain handover timestamp, a list of associated NE sub-session identifiers, etc. The handover charging identifier and the additional charging information comprises online charging context information for OCS 806.

When inserting the NE charging identifier in the charging message along with other charging information, the CCR [Initial] may have an attribute value pair (AVP) already designated for the NE charging identifier and the other charging information. To insert the handover charging identifier (and possibly other online charging information), a new AVP in the CCR message may be designated for the handover charging identifier. With the context information inserted, VCC application server 818 transmits the CCR[Initial] to OCS 806.

OCS 806 receives the CCR[Initial] and stores the context information included in the CCR[Initial]. OCS 806 processes the context information to determine a charging rate for the session over IMS network 802. OCS 806 then generates a Diameter CCA[Initial] that includes the credit quota, and transmits the Diameter CCA[Initial] to VCC application server 818. OCS 806 may also include additional context information in the CCA[Initial]. VCC application server 818 then begins monitoring the credit quota for dual mode device 830. If the quota is consumed, VCC application server 818 may transmit a CCR[Update] requesting a new credit quota from OCS 806.

VCC application server 818 then transmits a SIP 200 OK to S-CSCF 812. VCC application server 818 may insert the handover charging identifier in the 200 OK as part of distributing the handover charging identifier to the network elements of IMS network 802. Also, VCC application server 818 may have distributed the handover charging identifier to the network elements of IMS network 802 in a previous signaling message.

Responsive to the receiving the 200 OK, S-CSCF 812 identifies a charging event. Thus, S-CSCF 812 generates a Diameter CCR[Initial], identifies the handover charging identifier assigned to the session (as provided by VCC application server 818), and inserts the handover charging identifier in the Diameter CCR[Initial]. S-CSCF 812 may also include an NE charging identifier, and other charging information in the CCR[Initial]. For example, S-CSCF 812 may also include an NE type, an NE address, a domain type, a domain realm, a user identifier, a destination identifier, service information, service type, request type, a sub-session identifier, a sub-session service start/stop time, a sub-session service elapse time, etc. The handover charging identifier and the additional charging information comprises online charging context information for OCS 806. To insert the handover charging identifier (and possible other online charging information), a new AVP in the CCR message may be designated for the handover charging identifier. S-CSCF 812 then transmits the CCR[Initial] to OCS 806 for dialog 2 charging.

OCS 806 receives the CCR[Initial] and stores the context information included in the CCR[Initial]. OCS 806 processes the context information to determine a charging rate for the session over IMS network 802. OCS 806 then generates a Diameter CCA[Initial] that includes the credit quota, and transmits the Diameter CCA[Initial] to S-CSCF 812. OCS 806 may also include additional context information in the CCA[Initial]. S-CSCF 812 then begins monitoring the credit quota for dual mode device 830 for dialog 2. If the quota is consumed, S-CSCF 812 may transmit a CCR[Update] requesting a new credit quota from OCS 806.

Next, S-CSCF 812 transmits the 200 OK to endpoint 840. S-CSCF 812 again identifies a charging event, and transmits a CCR[Initial] to OCS 806 for dialog 1 charging with the VCC context information. OCS 806 processes the context information, grants a credit quota, and transmits a CCA[Initial] to S-CSCF 812. S-CSCF 812 then begins monitoring the credit quota for dual mode device 830 for dialog 1. If the quota is consumed, S-CSCF 812 may transmit a CCR[Update] requesting a new credit quota from OCS 806.

Endpoint 840 then transmits a SIP ACK message to S-CSCF 812. S-CSCF 812 transmits the SIP ACK to VCC application server 818. This completes the establishment of SIP dialog 1 between endpoint 840 and VCC application server 818. VCC application server 818 then transmits the SIP ACK to dual mode device 830 (via S-CSCF 812 and P-CSCF 814). This completes the establishment of SIP dialog 2 between dual mode device 830 and VCC application server 818. The session is thus established over IMS network 802 between dual mode device 830 and endpoint 840, and communication may commence through a bearer connection, such as an RTP connection.

During the session over IMS network 802, S-CSCF 812, VCC application server 818, or other network elements in IMS network 802 may transmit CCR[Update] messages to OCS 806 to request additional credit quotas (not shown in FIG. 9). In response to the CCR[Update] messages, OCS 806 will transmit CCA[Update] messages that include the granted credit quotas.

Assume further for this embodiment that dual mode device 830 comes into the service area of circuit-switched network 804 and registers with circuit-switched network 804 (see FIG. 10). Dual mode device 830 may request a transfer (or handover) from IMS network 802 to circuit-switched network 804 for a variety of reasons, such as if WiFi access network 816 is no longer in range of dual mode device 830. To initiate the handover, dual mode device 830 transmits a 1x call origination message to MSC 822 (via base station 824).

Responsive to the call origination message, MSC 822 obtains the service profile for dual mode device 830. MSC 822 then transmits an ANSI ORREQ message to a VCC application server 818 (assuming VCC application server 818 has an integrated WIN SCP function). VCC application server 818 determines that this is a domain transfer (DT) scenario based on the VDN in the Called Party Number (and the Calling Party Number) in the ORREQ message, and then allocates an IMS Routing Number, which is an E.164 temporary routing number associated with this DT. VCC application server 818 then transmits an ANSI orreq message to MSC 822. VCC application server 818 may insert the handover charging identifier in the ANSI orreq message as part of distributing the handover charging identifier to the network elements of circuit-switched network 804. MSC 822 then transmits a 1x traffic assignment message (via base station 824) to dual mode device 830. Base station 824 acquires the reverse traffic channel for dual mode device 830, and the voice path is established with MSC 822.

The Called Party Number is either the dialed digit string in the 1x call origination message or, in the event that origination triggering resulted in the allocation of an IMRN, in the IMRN. The translation of Called Party Number performed by MSC 822 results in an ISUP IAM message being routed to MGCF 815. MSC 822 includes the E.164 MDN of dual mode device 830 in the Calling Party Number field of the IAM message.

MGCF 815 requests the MGW (not shown) to create two terminations. The first termination is a TDM connection between the MGW and MSC 822. The second termination is an RTP/UDP/IP ephemeral termination. MGCF 815 then transmits a SIP INVITE (via I-CSCF 813) to VCC application server 818 containing the Request-URI, a P-Asserted-Identity, and an SDP offer. The Request-URI is based upon the IAM Called Party Number, the P-Asserted-Identity is based upon the IAM Calling Party Number, and the SDP offer is based upon the MGW SDP information. VCC application server 818 processes the P-Asserted-Identity header of the INVITE to determine which subscriber is performing the VoIP-to-1x circuit-switched voice DT. VCC application server 818 then transmits a SIP 183 Session Progress to MGCF 815, and MGCF 815 transmits an ISUP ACM message to MSC 822.

If a SIP dialog has been established between the user identified in the P-Asserted-Identity and a remote user, then VCC application server 818 identifies the endpoint 840 of the ongoing session. VCC application server 818 generates a SIP re-INVITE with the Request-URI set to the endpoint 840 and an SDP offer based upon the Visited MGW SDP information. VCC application server 818 transmits the re-INVITE to S-CSCF 812, and S-CSCF 812 forwards the re-INVITE to endpoint 840.

Endpoint 840 modifies its RTP bearer termination with the MGW SDP and responds with a SIP 200 OK to S-CSCF 812 containing an SDP answer with the endpoint 840 SDP information. S-CSCF 812 forwards the 200 OK to VCC application server 818. Responsive to the 200 OK, VCC application server 818 transmits a CCR[Update] to OCS 806 that includes the context information and DT information. OCS 806 processes the CCR[Update], and responds with CCA[Update].

OCS 806 may also request that the network elements in IMS network 802 surrender any unused credits. To make such a request, OCS 806 transmits a SIP RAR to VCC application server 818 and S-CSCF 812 requesting the remaining balance of credits back. In response to the RAR, VCC application server 818 and S-CSCF 812 transmit a SIP RAA to OCS 806. VCC application server 818 and S-CSCF 812 also transmit a CCR[Update] to OCS 806 with the remaining credits. OCS 806 processes the CCR[Update], and returns the unused credits back to the account of the user of dual mode device 830. OCS 806 then transmits a CCA[Update] to both VCC application server 818 and S-CSCF 812.

VCC application server 818 also transmits a SIP 200 OK (via I-CSCF 813) to MGCF 815 containing an SDP answer with the endpoint 840 SDP information. MGCF 815 requests modification of the MGW ephemeral termination with the endpoint 840 SDP information and instructs the MGW to reserve/commit remote resources. MGCF 815 transmits an ISUP ANM message to MSC 822. Anytime after the 200 OK is received, MGCF 815 transmits a SIP ACK message (via I-CSCF 813) to VCC application server 818. This completes the establishment of SIP dialog 3 between MGCF 815 and VCC application server 818. VCC application server 818 records the location of dual mode device 830 as present in circuit-switched network 804. VCC application server 818 then transmits a SIP ACK message to S-CSCF 812, and S-CSCF 812 forwards the ACK to endpoint 840.

MSC 822 may then trigger on a charging event for the session. Responsive to the charging event, MSC 822 generates an ANSI ORREQ message, identifies the handover charging identifier assigned to the session (as provided by VCC application server 818), and inserts the handover charging identifier in the ORREQ message (see FIG. 11). MSC 822 may also include an NE charging identifier, and other charging information in the ORREQ message. As with IMS network 802, the handover charging identifier and the additional charging information comprises online charging context information for OCS 806. To insert the handover charging identifier (and possible other online charging information), a new parameter in the ORREQ message may be designated for the handover charging identifier. MSC 822 then transmits the ORREQ message, along with other 1X circuit-switched domain charging information, to OCS 806 for dialog 1 charging.

OCS 806 processes the ORREQ message and context information with previous requests from IMS network 802. OCS 806 processes the context information to determine a charging rate for the session over circuit-switched network 804. OCS 806 grants a new credit quota to dual mode device 830 for dialog 3, and transmits an ANSI orreq message back to MSC 822 with the granted credit quota. MSC 822 then begins monitoring the credit quota for dual mode device 830 for dialog 3. If the quota is consumed, MSC 822 may transmit an ANSI ANLYZD requesting a new credit quota from OCS 806.

VCC application server 818 then transmits a SIP BYE message to dual mode device 830 (via S-CSCF 812) to release SIP dialog 2 between dual mode device 830 and VCC application server 818. Dual mode device 830 responds to VCC application server 818 with a SIP 200 OK (via S-CSCF 812).

When the session comes to an end, MSC 822 transmits an ANSI TDISCONNECT message to OCS 806 with the remaining credit. OCS 806 processes and updates the user's account. OCS 806 responds to MSC 822 with a tdisconnect message. VCC application server 818 transmits a CCR[Final] to OCS 806 with the remaining credit. OCS 806 processes and updates the user's account, and responds to VCC application server 818 with a CCA[Final].

OCS 806 then generates CDRs for S-CSCF 812, VCC application server 818, and MSC 822 charging activities. OCS 806 may correlate all CDRs for S-CSCF 812, VCC application server 818, and MSC 822 charging activities into one single CDR which may be sent to a billing system, customer care center, revenue assurance center, network management center, etc.

During the session, MGCF 815, I-CSCF 813, P-CSCF 814, and other network elements may also query OCS 806 for online charging. OCS 806 will correlate all of context information, verify the price plan, and determine a charging rate for the session. There may be multiple handovers occurring during the session, so OCS 806 stores all of the context information until the session ends. OCS 806 may then delete the context information, and write this information into CDRs or call logs.

Although specific embodiments were described herein, the scope of the invention is not limited to those specific embodiments. The scope of the invention is defined by the following claims and any equivalents thereof.

We claim:

1. A system operable to provide online charging for a session of a dual mode device that is transferred from a first network domain to a second network domain, the system comprising:
at least one network element in the second network domain that is operable to receive a handover charging identifier for the session that was handed over from the first network domain to the second network domain, wherein the handover charging identifier identifies the session for online charging across the first network domain and the second network domain the at least one network element is further operable to store the handover charging identifier, to identify a triggering event for charging during the session over the second network domain, to generate an online charging request for the session and insert the handover charging identifier in the online charging request, and to transmit the online charging request to an online charging system.

2. The system of claim 1 further comprising the online charging system that is operable to:
receive the online charging request from the at least one network element in the second network domain;
process the online charging request to identify the handover charging identifier;
correlate the online charging request with other online charging requests for the session based on the handover charging identifier to determine a charging rate;
grant a credit quota based on the charging rate;
generate an online charging response that includes the credit quota; and
transmit the online charging response to the at least one network element in the second network domain.

3. The system of claim 2 wherein the online charging system is operable to:
identify the transfer of the session from the first network domain to the second network domain;
determine whether to have at least one network element in the first network domain surrender unused credits granted to the at least one network element in the first network domain while the session was in the first network domain;
transmit a credit return request to the at least one network element in the first network domain responsive to a determination to surrender the unused credits;
receive at least one online charging request from the at least one network element in the first network domain that includes the unused credits; and
return the unused credits to an account of the user of the dual mode device.

4. The system of claim 1 further comprising a handover application server operable to:
receive a session initiation request from the at least one network element in the second network domain;
identify the handover charging identifier for the session; and
distribute the handover charging identifier to the at least one network element in the second network domain indicating the handover charging identifier to be used in online charging requests to the online charging system.

5. The system of claim 4 wherein the handover application server is further operable to:
generate another online charging request for the session;
insert the handover charging identifier in the other online charging request; and
transmit the other online charging request to the online charging system.

6. The system of claim 1 wherein the at least one network element in the second network domain is further operable to:
insert a handover indicator in the online charging request indicating the transfer of the session from the first network domain to the second network domain.

7. The system of claim 6 wherein the at least one network element in the second network domain is further operable to:

identify a timestamp of the transfer of the session from the first network domain to the second network domain; and insert the timestamp in the online charging request.

8. The system of claim 7 wherein the online charging request comprises a Diameter charging request, and the at least one network element in the second network domain is further operable to:

insert the handover charging identifier in a first new attribute value pair (AVP) in the Diameter charging request;

insert the handover indicator in a second new attribute value pair (AVP) in the Diameter charging request; and insert the timestamp in a third new attribute value pair (AVP) in the Diameter charging request.

9. A method of providing online charging for a session of a dual mode device that is transferred from a first network domain to a second network domain, the method comprising:

receiving a handover charging identifier in at least one network element in the second network domain, wherein the handover charging identifier identifies the session for online charging across the first network domain and the second network domain;

storing the handover charging identifier in the at least one network element in the second network domain;

identifying a triggering event for charging in the at least one network element in the second network domain during the session over the second network domain, generating an online charging request for the session and inserting the handover charging identifier in the online charging request; and transmitting the online charging request to an online charging system.

10. The method of claim 9 further comprising:

receiving the online charging request in the online charging system from the at least one network element in the second network domain;

processing the online charging request in the online charging system to identify the handover charging identifier;

correlating the online charging request with other online charging requests for the session based on the handover charging identifier to determine a charging rate;

granting a credit quota based on the charging rate;

generating an online charging response that includes the credit quota; and transmitting the online charging response from the online charging system to the at least one network element in the second network domain.

11. The method of claim 10 further comprising:

identifying the transfer of the session from the first network domain to the second network domain in the online charging system;

determining whether to have at least one network element in the first network domain surrender unused credits granted to the at least one network element in the first network domain while the session was in the first network domain;

transmitting a credit return request to the at least one network element in the first network domain responsive to a determination to surrender the unused credits;

receiving at least one online charging request from the at least one network element in the first network domain that includes the unused credits; and returning the unused credits to an account of the user of the dual mode device.

12. The method of claim 9 further comprising:

receiving a session initiation request in a handover application server from the at least one network element in the second network domain;

identifying the handover charging identifier for the session; and distributing the handover charging identifier to the at least one network element in the second network domain indicating the handover charging identifier to be used in online charging requests to the online charging system.

13. The method of claim 12 further comprising:

generating another online charging request for the session in the handover application server;

inserting the handover charging identifier in the other online charging request; and transmitting the other online charging request from the handover application server to the online charging system.

14. The method of claim 9 further comprising:

inserting a handover indicator in the online charging request indicating the transfer of the session from the first network domain to the second network domain.

15. The method of claim 14 further comprising:

identifying a timestamp of the transfer of the session from the first network domain to the second network domain; and inserting the timestamp in the online charging request.

16. The method of claim 15 wherein the online charging request comprises a Diameter charging request, and the method further comprises:

inserting the handover charging identifier in a first new attribute value pair (AVP) in the Diameter charging request;

inserting the handover indicator in a second new attribute value pair (AVP) in the Diameter charging request; and inserting the timestamp in a third new attribute value pair (AVP) in the Diameter charging request.

17. A method of operating a handover application server to provide online charging for a session of a dual mode device that is transferred from a first network domain to a second network domain, the method comprising:

receiving a session initiation request from at least one network element that is serving the session in the second network domain which was handed over from the first network domain identifying a handover charging identifier for the session; and distributing the handover charging identifier to the at least one network element in the second network domain indicating the handover charging identifier to be used in online charging requests to an online charging system;

wherein the handover charging identifier is assigned for online charging for the session over the first network domain and the second network domain.

18. The method of claim 17 further comprising:

receiving another session initiation request from at least one network element that is serving the session in the first network domain prior to the session being transferred to the second network domain;

identifying the handover charging identifier for the session; and distributing the handover charging identifier to the at least one network element in the first network domain indicating the handover charging identifier to be used in online charging requests to the online charging system.

19. The method of claim 18 further comprising:

generating an online charging request for the session in the handover application server;

inserting the handover charging identifier in the online charging request; and transmitting the online charging request to the online charging system.

20. The method of claim 19 wherein the online charging request comprises a Diameter charging request, and the method further comprises:

inserting the handover charging identifier in a new attribute value pair (AVP) in the Diameter charging request.

* * * * *